Dec. 8, 1964     W. SPILLMANN     3,159,970
THERMAL POWER PLANT WITH CLOSED CIRCUIT OF A GASEOUS
WORKING MEDIUM AND AN OPEN GAS-TURBINE PLANT
Filed April 3, 1962
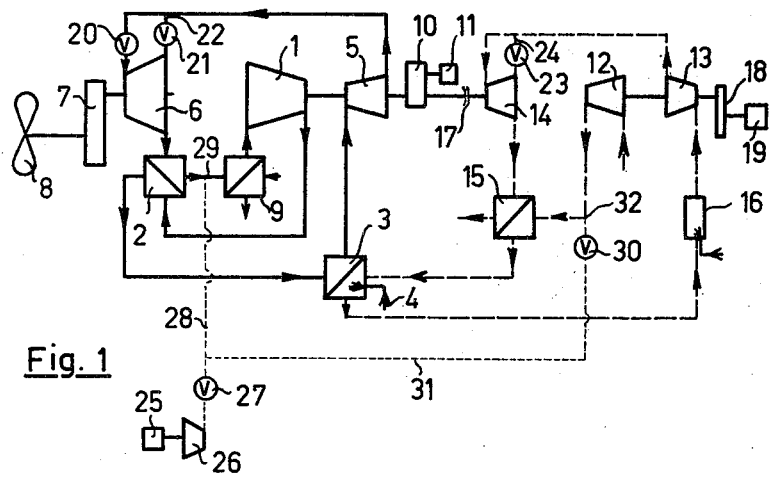
Fig. 1
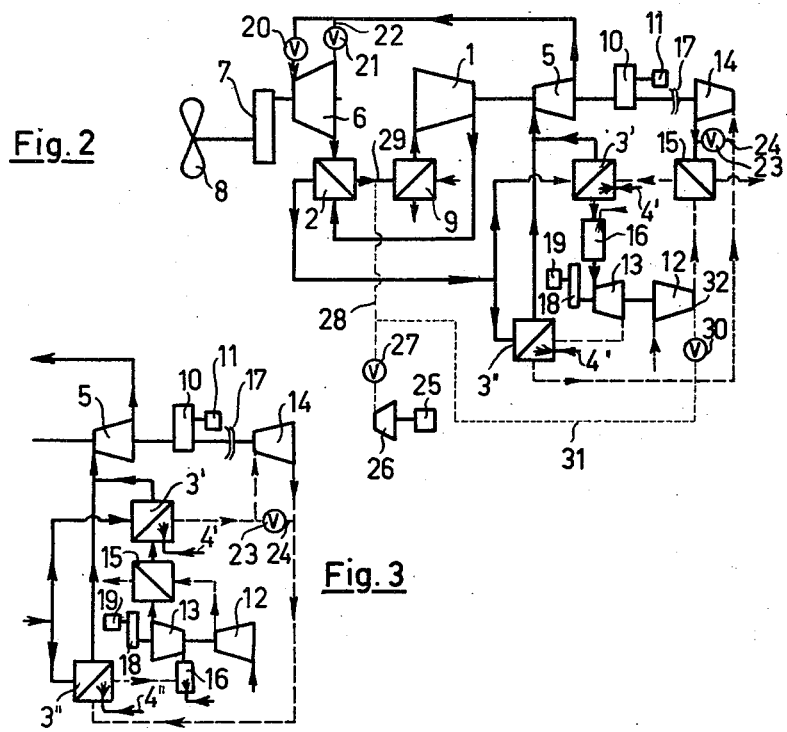
Fig. 2
Fig. 3
WERNER SPILLMANN
INVENTOR.
BY
Attorneys

United States Patent Office 3,159,970
Patented Dec. 8, 1964

3,159,970
THERMAL POWER PLANT WITH CLOSED CIRCUIT OF A GASEOUS WORKING MEDIUM AND AN OPEN GAS-TURBINE PLANT
Werner Spillmann, Zurich, Switzerland, assignor to Escher Wyss Aktiengesellschaft, Zurich, Switzerland, a corporation of Switzerland
Filed Apr. 3, 1962, Ser. No. 184,725
Claims priority, application Switzerland, Apr. 24, 1961, 4,767/61
6 Claims. (Cl. 60—39.18)

This invention relates to a thermal power plant with a closed circuit of a gaseous working medium, in which said working medium is raised to a high pressure in a compressor and is heated in at least one heater by means of heat-exchange walls by combustion of a fuel, and is thereupon expanded while doing work in a turbine driving the compressor and in a useful power turbine, and in which an open gas turbine plant is provided, the compressor of which supplies the combustion air for the heater of the closed circuit, and at the same time serves to supercharge said heater, and which in addition to the turbine driving the combustion-air compressor has a further turbine separated mechanically from this latter turbine.

In a known thermal power plant of this kind, intended for ship propulsion, the said further turbine of the open gas-turbine plant, together with the useful power turbine of the closed circuit, delivers power to the ship's propeller. The power required for the propulsion of the ship in this case is produced, up to a certain power level, only in the plant with closed circuit, while in peak load operation, which may occur more particularly in the case of warships, the additional power required for the ship's propulsion is produced by the useful power turbine of the open gas-turbine plant.

Since, however, in the operation of the open gas-turbine plant, the heater of the closed circuit is supercharged to a pressure above atmospheric, it is in principle possible to transfer in this heater even more heat to the working medium of the closed circuit. In the known plant, however, this possibility cannot be utilised without exceeding the maximum pressure and temperature for which the closed circuit is designed.

A more advantageous solution of the problem of absorbing a peak power is now provided according to the invention in a plant of the kind hereinbefore described by the fact that the further turbine of the open gas-turbine plant, which turbine is separated mechanically from the turbine driving the combustion air compressor, is coupled to the compressor group of the closed circuit.

The effect of this step is that when the open gas-turbine plant or this further turbine is started up, the compressor group of the closed circuit is raised to a higher speed. The compression ratio in the closed circuit and the cycled gas quantity are thereby increased, and it is possible to produce with the useful power turbine of the closed circuit a higher power than in normal operation, without exceeding the fixed maximum pressure and temperature in the closed circuit. Due to the increased compression ratio, for practically constant temperature of the working medium in the heater and higher rate of flow, it is possible to supply to the working medium a larger quantity of heat from the combustion gases. The useful power is therefore increased not only on account of the compression power supplied by the open gas-turbine plant, but also due to the increased heat supply in the heater. The effect is therefore more pronounced than if the turbine of the open gas turbine plant were to supply useful power directly to the ship's propeller.

Constructional examples of the subject of the invention are represented in simplified form in the drawings, wherein:

FIG. 1 shows a plant with a single heater, and
FIG. 2 a plant with two heaters for the working medium of the closed circuit.
FIG. 3 shows a modification for the connection of the turbines of the open gas-turbine plant.

According to FIG. 1, the closed circuit of the thermal power plant first leads through a compressor 1, in which the gaseous medium, preferably air, is raised to a high pressure. The compressed working medium is thereupon preheated in a heat-exchanger 2, and is heated to its final temperature in a heater 3 by means of heat-exchange walls by the combustion of a fuel supplied through a pipe 4. The compressed working medium thus heated is thereupon successively expanded in a turbine 5, which drives the compressor 1, and in a useful power turbine 6, running at a speed independent of the first-mentioned turbine and driving the ship's propeller 8 by means of gearing 7. The working medium leaving the turbine 6 gives up heat to the compressed working medium in the heat-exchanger 2, and after further cooling in a cooler 9 is re-supplied to the compressor 1. A starting motor 11 is furthermore connected by gearing 10 to the compressor group 1–5.

There is furthermore provided an open gas-turbine plant having a compressor 12, a turbine 13 driving said compressor and a further turbine 14, separated mechanically from the turbine 13. The compressor 12, by way of a heat-exchanger 15, supplies the combustion air for the heater 3 of the closed circuit and at the same time serves to supercharge this heater. The hot waste gases from the heater 3 pass via an auxiliary combustion chamber 16 to the turbine 13, in which they are expanded and provide the necessary power for driving the compressor 12, and thereupon they expand in turbine 14 to substantially atmospheric pressure. The exhaust gases leaving the turbine 14 give up heat to the compressed combustion air in the heat-exchanger 15. The turbine 14 of the open gas-turbine plant is connected via a disengageable coupling 17 to the compressor group 1–5 of the closed circuit. The group 12, 13 is connected to a starting motor 19 by gearing 18.

A throttle valve 20 is connected in front of the useful power turbine 6 and a by-pass valve 21 is built into a by-pass pipe 22 of this turbine 6. These valves are provided for regulating purposes in known manner. In the case of the turbine 14 of the open gas-turbine plant, a by-pass pipe 24, adapted to be closed by a controllable valve 23, is furthermore provided.

For supercharging the closed circuit, there is provided an auxiliary compressor 26, which is driven by a motor 25, and which on the pressure side is connected by a pipe 28, provided with a valve 27, to a point 29, situated between the heat-exchanger 2 and the cooler 9, on the path of flow of the expanded working medium of the closed circuit. Opening into the pipe 28 is a pipe 31 provided with a valve 30 and starting from a point 32 of the path of flow of the compressed combustion air supplied by the compressor 12.

The operation of the plant is as follows:

In the case of partial load, the compressor 12 operates at reduced speed as combustion air blower, without substantially supercharging the air heater 3. The power supplied by the turbine 14 of the open gas-turbine plant may be substantially zero. By opening the valve 23, the turbine 14 can be by-passed by the power medium. By disengaging the coupling 17, the turbine may also be separated from the compressor group 1–5.

For producing an overload, the group 12, 13 is raised to a higher speed by increasing the fuel supply to the heater 3 and possibly also by further fuel supply to the auxiliary combustion chamber 16. The combustion air is thereby raised to a higher pressure in the compressor 12. The combustion gases leaving the turbine 13 also pass under higher pressure to the turbine 14, which now gives additional power to the compressor 1 of the closed circuit. The group 1–5 is thereby raised to a higher speed and the compression ratio in the closed circuit is increased. Thus, even with constant maximum pressure, a higher expansion ratio is available in the turbines 5, 6. The useful power provided by the turbine 6 is increased. Since, in accordance with the higher compression ratio, the temperature gradient in the turbines increases, a larger amount of heat can also be supplied to the working medium in the heater 3, for constant maximum pressure. This increased heat requirement therefore coincides favourably with the combustion-gas supercharging of the heater 3. The heater 3 is a source of heat simultaneously for the closed circuit and for the open gas turbine.

Starting from the basis that the closed circuit without additional drive of the group 1–5 by the turbine 14 when supercharged to maximum pressure produces a power of 100%, and if now for example the compressor group 1–5 is supplied additionally with a power of 38% by the open gas-turbine plant, the turbine 6 can produce a useful power of 160%. The power gain is therefore substantially greater than the power produced additionally by the open gas-turbine plant. The efficiency, however, is slightly reduced, since the closed plant operates with a pressure ratio exceeding the best value.

For starting the plant, the group 12, 13 is first started by means of the starting motor 19, the auxiliary combustion chamber 16 being ignited. The group 1–5 is then set in operation by means of the turbine 14 and by ignition of the air-heater 3, and the auxiliary combustion chamber 16 is cut out. The closed circuit is first of all supercharged by means of the compressor 12 by way of pipe 31, and the residual supercharging is effected by means of the auxiliary compressor 26. In addition to being used for starting up, the auxiliary combustion chamber 16 can also be used for control operations.

The thermal power plant according to FIG. 2 differs from that according to FIG. 1 by the fact that instead of only one heater 3, two heaters or heater parts 3′ and 3″ are provided, these heaters being connected in parallel with reference to the working medium of the closed circuit. These heaters are provided with fuel by the pipes 4′ and 4″. The other components are provided with the same reference numerals as in FIGURE 1.

The compressed air supplied by the compressor 12 first of all passes through the heat-exchanger 15 and thereupon to the heater 3′, in which the fuel supplied by the pipe 4′ is burnt. If necessary, further fuel is burnt in the auxiliary combustion chamber 16 in front of the turbine 13, and the combustion gases then serve as power gases for the turbine 13 of the open gas-turbine plant.

The heater or heater part 3″ now serves for the intermediate heating of the combustion gases between the turbines 13 and 14 of the open gas-turbine plant, through which turbines the medium flows in series. Further fuel supplied by the pipe 4″ is burnt in the exhaust gases of the turbine 13 before they reach the turbine 14 of the open gas-turbine plant, which turbine is coupled to the compressor group 1–5 of the closed circuit.

FIGURE 3 finally shows a modification differing from the plant according to FIGURE 2 merely by the fact that the power medium flows through the turbines 13 and 14 of the open gas-turbine plant in the reverse sequence. The power medium passes from the heater 3′ first of all to the turbine 14. It is reheated in the heater 3″ and if necessary undergoes further heating in the auxiliary combustion chamber 16 before it reaches the turbine 13 driving the compressor 12. The exhaust gases again give up heat to the compressed combustion air in the heat-exchanger 15.

In the thermal power plants described, the overload capacity depends on the power ratio between the closed and open gas-turbine plants. Only low external powers are required for starting the plant. If desired, the plants can even be started independently by an auxiliary network. Another advantage is that the air heater or heater parts require only a small convection part, since after leaving the air heaters, the combustion gases can still be expanded by the turbines 13 and 14. The air heaters operate with a comparatively large temperature difference between the fuel gas and the working gas of the closed circuit and may be of comparatively small size, which is particularly advantageous in the case of ships.

What is claimed is:

1. In combination a thermal power plant operating with a closed circuit of a gaseous working medium comprising compressing means in which said working medium is brought to a high pressure; a heater including heat exchange walls through which the high-pressure medium is heated by combustion of fuel; first turbine means in which the so-heated working medium is allowed to expand while doing work; cooling means for the so-expanded working medium; and flow connections connecting said compressing means, said heater, said first turbine means and said cooling means to define the said closed circuit for the working medium; said first turbine means comprising a first turbine connected to drive said compressing means and a useful power turbine running at a speed independent of said turbine which drives the compressing means; and an open gas turbine plant comprising a compressor connected with said heater so as to supply combustion air to the fuel to be burnt and to supercharge said heater; second turbine means connected with said heater so as to allow the combustion gases to expand while doing work; said second turbine means comprising a turbine connected to drive said combustion air compressor and a further turbine mechanically independent of said useful power turbine and of said turbine which drives the combustion air compressor, but drivingly connected with the compressing means of the closed circuit.

2. The combination defined in claim 1 in which a disengageable coupling is provided between the compressing means of the closed circuit and said further turbine of the open gas turbine plant which is drivingly connected with said compressing means.

3. The combination defined in claim 1 comprising a by-pass pipe provided with a controllable valve arranged to allow to by-pass said further turbine of the open gas turbine plant.

4. The combination defined in claim 1 in which the said further turbine and the said compressor driving turbine of the open gas turbine plant are arranged to be traversed in series by the combustion gases and in which the heater for heating the working medium of the closed circuit comprises at least two parts, one of which is interposed between said further turbine and said compressor driving turbine so as to serve for the intermediate heating of the combustion gases.

5. The combination defined in claim 1 in which, for the purpose of supercharging the closed circuit, a closable pipe is disposed so as to connect a point of the open gas turbine plant through which compressed combustion air flows with a point of the closed circuit through which expanded working medium flows.

6. The combination defined in claim 1 in which, for starting and regulating operations, an auxiliary combustion chamber is disposed in front of the turbine which drives the combustion air compressor.

References Cited by the Examiner

UNITED STATES PATENTS

| | | | |
|---|---|---|---|
| 2,298,663 | 10/42 | Traupel | 60—49 |
| 2,482,791 | 9/49 | Nettel et al. | 60—39.18 |

FOREIGN PATENTS

| | | |
|---|---|---|
| 978,631 | 11/50 | France. |
| 584,479 | 1/47 | Great Britain. |
| 587,449 | 4/47 | Great Britain. |
| 639,451 | 6/50 | Great Britain. |
| 650,235 | 2/51 | Great Britain. |

SAMUEL LEVINE, *Primary Examiner.*

ABRAM BLUM, *Examiner.*